J. O. LUTHY.
STORAGE BATTERY.
APPLICATION FILED JULY 28, 1914.

1,175,280.

Patented Mar. 14, 1916.

Witnesses.
D. W. Edelin.

Inventor.
Joseph O. Luthy

UNITED STATES PATENT OFFICE.

JOSEPH O. LUTHY, OF SAN ANTONIO, TEXAS.

STORAGE BATTERY.

1,175,280.   Specification of Letters Patent.   Patented Mar. 14, 1916.

Application filed July 28, 1914. Serial No. 853,576.

*To all whom it may concern:*

Be it known that I, JOSEPH O. LUTHY, a citizen of the Republic of Switzerland, residing in San Antonio, county of Bexar, State of Texas, have invented certain new and useful Improvements in Storage Batteries; and I do hereby declare the following to be a full, clear, and exact description of the invention, such as will enable others skilled in the art to which it appertains to make and use the same.

The invention relates to storage batteries, and more particularly to storage battery cells of the so-called dry type, in which the electrolyte surrounding the plates or electrodes is in the form of a relatively soft but consistent paste.

The object of the invention is to provide a storage battery of the type indicated, which is simple in construction, durable in operation, comparatively light in weight, not liable to injury or deterioration, and which is capable of ready application under all circumstances and conditions where ordinary primary dry cells are employed, and also as a substitute for the more expensive forms of secondary or storage batteries.

The invention is particularly adapted to the manufacture of small size cells or units to be used in portable flash-lights and like apparatus, in which it is desirable to reduce the weight to a minimum.

The invention also contemplates a construction and arrangement of the parts of the cell to admit of the latter being turned upside down and engaged with a special form of charging panel or table for charging and re-charging the cells either in multiple or series arrangement.

The invention is illustrated in the accompanying drawings, in which,—

Figure 1:
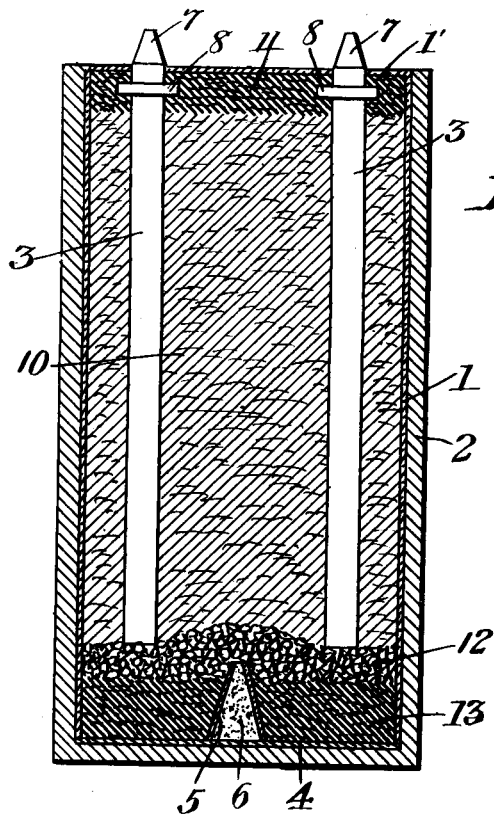
Figure 2:
Figure 4:
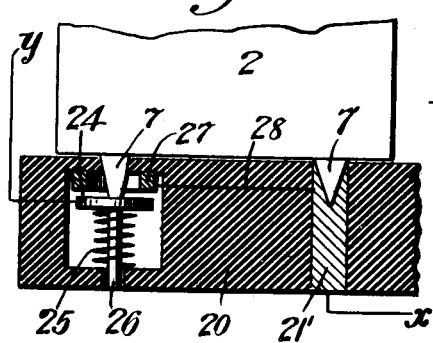
Figure 3:
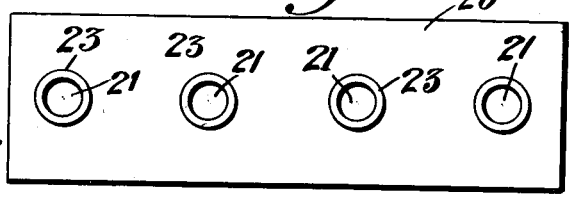

Figure 1 is a vertical section through a secondary cell, involving the invention, the electrodes being shown in elevation. Fig. 2 is a vertical section through a charging panel or table for use in charging the secondary cell in parallel. Fig. 3 is a plan view of the charging panel or table. Fig. 4 is a vertical section showing a modified form of charging table adapted to charge the cells in series.

Referring to the drawings, 1 indicates an inner receptacle or container preferably formed of relatively thin celluloid or the like, to render the container water-proof and acid-proof, said container having a top wall 1', preferably integral therewith and provided with two openings through which the terminals of the electrodes or grids project. The bottom of the container 1 is preferably formed of a removable disk 4 of similar material which constitutes a closure therefor. The entire container fits snugly within an outer shell or envelop 2 which is preferably made of some light material, such as paper, paste-board or other compressed fibrous material, which may be pressed or molded to the desired form to admit of the inner container being readily removed therefrom. The receptacle 2 is made sufficiently strong and heavy to withstand ordinary rough usage to which apparatus of this kind is subjected.

Spaced within the container 2 are the positive and negative electrodes 3, 3, which may be conveniently formed of relatively light lead grids filled with active material of a suitable character, which electrodes are preferably of the type shown and described in my co-pending application, Serial No. 849,388, filed July 7, 1914. The upper portion of each electrode 3, 3 is provided with an integral post having a terminal 7 which projects through the opening in the top wall of the container 1, said terminals being preferably frusto-conical in shape to admit of them making firm contact with the connector terminals of an electric circuit containing the translating devices to be operated by the battery and also to afford an efficient and automatic connection with specially constructed terminals of a charging panel or table to be hereinafter described. When the electrodes 3, 3 are placed in position in the inverted container 1, a layer 11 of insulating and sealing material, such as tar, pitch, or the like is poured around the terminals, as indicated in Fig. 1, to afford an effective seal for the same and also to constitute a support for the electrodes and prevent the latter being displaced, which supporting function is materially assisted by a collar or flange-like projection 8 cast on the upper portion of each grid and which is surrounded and embedded in the sealing material 11.

Surrounding and embedding the electrodes 3, 3 is a body of soft, paste-like material, preferably formed of a mixture of plaster of Paris, sulfuric acid and water, the aqueous solution of sulfuric acid constituting the electrolyte which is distributed throughout the mass of plaster of Paris, and forms therewith a permanently plastic but consistent paste enveloping the electrodes and assisting in maintaining the latter in their properly spaced relation. Below the paste-like electrolyte there is disposed a layer of porous gas-absorbing material 12, preferably charcoal, and below the latter, there is disposed a layer of tar, pitch or other acid-proof sealing and insulating material 13, which effectively seals the lower part of the container 2. Located centrally within the layer of sealing material 13 is a generally conical tube 5, which may be made of paraffin-coated paper or the like, which opens at its upper end into the body of porous material 12 and with its lower open end adjacent the removable bottom 4 of the container 1. The interior of the tube 5 is filled with sawdust or other suitable absorbent material 6.

In assembling the parts of the cell as described, the container 1 is inverted and the electrodes 3, 3 placed in position therein, and with the terminals projecting through the openings in the top wall of the container. The layer of sealing and insulating material 11 is then run in, after which the paste-like electrolyte 10 is filled in and packed about the electrodes to the desired height and on top of this is placed the layer of charcoal 12. The venting and filling tube 5 is then placed in position and the final layer of sealing and insulating material 13 poured about the same and until it fills the upper portion of the inverted container 1. The removable bottom 4 of the container is then placed in position and the outer envelop 2 slipped over the container until the latter fits snugly within the envelop, as illustrated in Fig. 1. The electrodes 3, 3 are preferably "formed" before they are assembled in the cell. The cell is now in condition for use and may be employed by connecting the terminals 7, 7 thereof with the circuit containing the lamps or other translating devices, by means of suitable clamping connectors. When it is desired to recharge the cell, after the same has run down, it is only necessary to remove the outer envelop 2, turn the cell upside down, remove the bottom plate 4, take out the sawdust from the tube 5 and pour a sufficient quantity of water into the cell through the tube 6, and then connect the terminals 7 with the charging circuit and permit the cell to be charged until it has completely recuperated.

In order to facilitate the charging operation, a special type of charging panel or table is provided, as shown in Figs. 2, 3 and 4 respectively. When the charging circuit is of a voltage sufficient to enable the cells to be charged in parallel, the charging panel or table may take the form shown in Figs. 2 and 3, namely an insulating base 20 having on its upper surface annular lugs 21 arranged in pairs and spaced apart a distance equal to that between the terminals 7, 7 of the individual cells. Within each lug 23 is secured a contact block 21 which is provided with a conical recess in its upper portion adapted to be engaged with a wedging action by the conical end of the corresponding terminal 7 of the cell, so that when the cell is inverted and its terminals placed in engagement with the corresponding contact blocks 21 of the charging panel, the current will flow from the charging circuit $x$—$y$, through the cell by way of said contact blocks. By reference to Fig. 2, it will be seen that the contact blocks are connected in parallel with the circuit leads $x$—$y$, so that when several of the cells are charged simultaneously, they are connected with the charging panel in multiple. It is only necessary to invert the individual cells and engage the terminals thereof with the corresponding contact blocks, after which the weight of the cells will maintain the latter in good electrical contact with the conducting elements of the charging panel.

When it is found desirable to charge the cells in series, a somewhat different construction of contact panel is employed. In Fig. 4, there is shown a section of a charging panel with one pair of contacts adapted to engage the terminals of a single cell. The panel consists of a base 20', a contact block 21' embedded therein and having a conical recess in its upper portion adapted to receive one terminal of the cell, and a second two-part terminal consisting of a plate 24 mounted upon a rod 26 and normally held in engagement by means of a spring 25 with a contact ring 27, all mounted within a recess in the base 20'. A conductor 28 connects contact block 21' with conductor ring 27. It will be understood that multiple pairs of contacts are mounted in the base 20', and that all of the contacts will be connected in series normally, and the current will flow from external circuit lead $x$ through all of the contacts to external circuit lead $y$. When one or more of the cells are to be charged, they are inverted and engaged with the charging panel in the manner shown in Fig. 4, namely with one terminal 7 in electrical contact with block 21' and the other terminal 7 engaging plate 24 of the movable contact and forcing the same down against the tension of spring 25 out of engagement with conductor ring 27. The current will now flow from lead $x$ through block 21', terminal 7 through the battery, thence by the opposite terminal 7 to contact plate 24 and thence to lead $y$. If several of the cells are to be simultaneously charged, they are mounted on corresponding pairs of contacts in the charging panel so that the current will flow through the cells and contacts in series. The charging contacts which are not engaged by the cell are adapted to maintain the circuit closed however, by means of the corresponding spring-pressed contact plate 24 engaging the coöperating ring 27. For example, if the cell were removed from engagement with the contacts shown in Fig. 4, plate 24 would immediately be moved by its spring 25 into engagement with ring 27, thereby closing the circuit from post 21' through wire 28, contact ring 27, plate 24 and thence to lead $y$. It will be understood, of course, that this form of charging panel is not essential to the successful operation of the invention, as the charging may be effected by connecting terminals 7, 7 of the cell with the leads of a charging circuit by means of clamping connectors. The charging panel however affords a simple and efficient device for use in charging cells of this character and may be so constructed as to prevent incorrect connections being established between the electrodes of the cell and the charging circuit. For example, by making the terminals 7, 7 of relatively different shapes and providing the posts 21, 21, with correspondingly shaped recesses, it will be apparent that only the proper terminals of the cell can be engaged with the corresponding contact blocks and the possibility of improper circuit connections will be obviated.

The particular function of the charcoal or other gas absorbing material is to take care of any gases which may be evolved during the discharging operation of the cell, which gases will be occluded by the charcoal while the cell is in operation and given off and discharging through the vent tube 5 when the cell is being recharged. The location of the liquid charging and venting tube in the bottom of the cell prevents gases or moisture coming in contact with the terminals at all times.

What I claim is:—

1. A storage battery comprising an acid-proof container, a removable envelop therefor, electrodes mounted in said container having terminals extending through the top wall of said container, an electrolyte containing paste surrounding and embedding the electrodes, a layer of porous gas-absorbing material below said paste, a layer of sealing material below the porous material, and a venting and liquid-charging tube mounted in said sealing layer and opening into said porous layer.

2. A storage battery comprising an acid-proof container, a removable envelop therefor, electrodes mounted in said container having terminals extending through the top wall of said container, a layer of sealing material below said top wall, an electrolyte containing paste surrounding and embedding the electrodes, a layer of porous gas-absorbing material below said paste, a layer of sealing material below the porous material, and a venting and liquid-charging tube mounted in said sealing layer and opening into said porous layer.

In testimony whereof I affix my signature, in presence of two witnesses.

JOSEPH O. LUTHY.

Witnesses:
   T. M. McCarthy,
   Yale Hicks.